Dec. 10, 1929.                P. MOOS                1,739,166
INDUCTION METER
Filed April 17, 1928
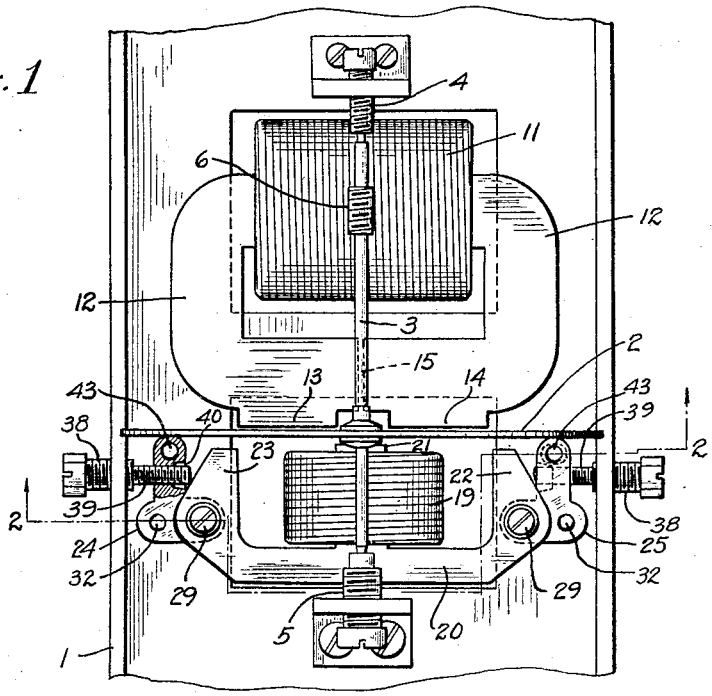
INVENTOR
Paul Moos
BY John D. Morgan
ATTORNEY Patented Dec. 10, 1929

1,739,166

UNITED STATES PATENT OFFICE

PAUL MOOS, OF ZUG, SWITZERLAND, ASSIGNOR TO LANDIS & GYR, A.-G., A LIMITED JOINT-STOCK COMPANY OF SWITZERLAND

INDUCTION METER

Application filed April 17, 1928, Serial No. 270,679, and in Switzerland April 25, 1927.

The invention relates to novel and useful improvements in induction meters and more especially to novel and useful means for effecting desired changes with great minuteness and exactness in the positional relation of the meter disc, or like element, and the electro-magnetic driving means therefor.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is an elevation of part of a meter mechanism embodying my invention; and

Fig. 2 is a partial section, on line 2—2, looking upwardly, and a partial bottom plan of Fig. 1.

The invention provides means for effecting a minute and exact regulation of the relative position of the meter disc and magnet cores, and thus in like manner of the torque exerted by the field fluxes of the driving magnets on the disc or other armature element, and especially for effecting such regulation without otherwise disturbing the meter structure or operation. More particularly, the invention provides means for minutely and exactly regulating the position of the core of at least one, and preferably only one, of the driving magnets with respect to the meter disc or like element. Preferably and as embodied this is effected by mounting one of the magnet cores to have movement relatively to the meter frame and the disc by means of a differential screw-threaded device.

Referring now in detail to the embodiment of the invention, illustrated by way of example in the accompanying drawings, a meter frame 1, adapted to be mounted within a meter casing in the usual manner is provided, and it may be of any known or other suitable form. A meter disc 2 is fixed on a spindle 3, which spindle is journaled at its ends in adjustable bearings 4 and 5 fixed on the frame 1, the spindle being provided with a worm 6, or other means for driving a register in the usual manner.

In the present embodiment, the invention is exemplarily shown applied to variably positioning the current core. Accordingly, as so embodied, the pressure coil 11 may be of any suitable form, and is shown mounted on the central rear reach of a C-shaped core 12, which core has pole pieces 13 and 14 for the pressure driving flux, and a shunt circuit with an air gap 15.

A current coil 19 is shown wound on the central arm 21 of the variably positionable current core 20, this core having two outer arms or pole pieces 22 and 23. In the embodied form of the variable positioning means for the current core 20, it is shown pivotally supported at opposite sides thereof on pivoted members, such as bell-crank levers 24 and 25 of non-magnetic metal or other suitable material. These mountings, respectively, preferably comprise a screw 29, the shank of which extends through a smooth cylindrical aperture in the current core 20, and is screw-threaded into the outer end of the arm 30 of the bell-crank lever, with a washer 31 interposed between the core and lever. Either bell-crank lever, or corresponding member, is pivotally mounted on the frame 1 by means of a screw 32, which screw is counter-sunk into the frame 1, and is screw-threaded into the corresponding lever 24 or 25 as shown in Fig. 2.

The means for minutely and accurately moving the pivoted core-supporting members 24 and 25, in the preferred form, comprise differential screw-threaded members operating between the frame 1 and the corresponding pivoted core-supporting member. As embodied, a differential screw 38, with relatively coarse thread, is screw-threaded into the frame 1, and a screw-threaded member 39, with a relatively fine thread is screwed into a corresponding tapped thread within the screw 38. The finer differential screws 39 are screw-threaded at their opposite ends into the corresponding pivoted members 24 and 25, and these are respectively cut away, on the opposite side, as shown at 40, to prevent binding. A screw 43 is provided, if desired, threaded into the end of the respective levers 24 or 25, and the shank of the screw works in a slot 44 in the frame 1, there being a spring washer between the head of the screw and the frame 1 to make a sliding but tight friction fit.

In assembling and preliminarily adjusting the mechanism, the screws 29, 32 and 43 may be turned up fairly tight after the disc is approximately in operative position with respect to the pole pieces of the current and pressure cores. Then by means of the differential screws 38 a very minute and accurate movement of the current core, in the present embodiment, and a corresponding relative positioning of the disc and pole pieces of the cores may be effected. The parts are constructed, and cooperate, so that they will remain in the desired position, and any further or future positioning required may be effected with the same minuteness and exactness without displacing or disturbing the mechanism.

The invention in its broader aspects is not limited to the specific mechanisms shown and described but departures may be made therefrom within the scope of the accompanying claims without departing from the principles of the invention and without sacrificing its chief advantages.

What I claim is:—

1. In an induction meter in combination a meter disc, driving means therefor comprising a current coil and core and a pressure coil and core and means for variably positioning one of said cores relatively to the disc including a movable support on which the core is mounted and a differential screw device for controlling the movement of said support.

2. In an induction meter in combination a meter disc, driving means therefor comprising a current coil and core and a pressure coil and core and means for variably positioning one of said cores relatively to the disc including a pivotally mounted support connected to the core and a differential screw device for moving said support.

3. In an induction meter, the combination of a meter disc, driving means therefor comprising a current coil and core, and a pressure coil and core, a movable support on which one of the cores is mounted and means for minutely varying the position of the support to move the core relatively to the disc.

In testimony whereof, I have signed my name to this specification.

PAUL MOOS.